United States Patent Office 2,964,472
Patented Dec. 13, 1960

2,964,472

METAL FORMING LUBRICANT AND METHOD OF MAKING SAME

William A. Blum, Fort Washington, Pa., assignor to Pennsalt Chemicals Corporation, a corporation of Pennsylvania No Drawing. Filed Nov. 8, 1955, Ser. No. 545,791

4 Claims. (Cl. 252—18)

This invention relates to soap compositions and more particularly to soap compositions adapted for the lubrication of metal prior to forming.

A particularly suitable soap composition for the lubrication of metal prior to forming can be prepared by blending together a fatty acid, sodium hydroxide, borax, sodium chloride, and water. The resulting product, however, though forming an excellent lubricant material, is obtained from the mechanical blending in the form of hard lumps or cakes which are only slowly soluble in water. Since it is the practice to dissolve the lubricant composition in water prior to application to the metal being formed, it is highly desirable to obtain the composition in as rapidly soluble a form as possible, a porous granular form being particularly desirable.

It has now been discovered that if sodium carbonate is used in place of the sodium hydroxide, and the composition is prepared by blending together a high titre fatty acid, sodium carbonate and a controlled amount of water within a specific temperature range, a granular product consisting of porous granules is obtained which readily dissolves in water.

The borax and the sodium chloride may or may not be present insofar as obtaining this granular product; however, in preparing the preferred metal drawing lubricants borax and sodium chloride are included, it generally being preferred that the borax be present in amounts of 0 to 30 parts and the sodium chloride be present in amounts of 0 to 15 parts per 100 parts by weight of the fatty acid.

In practicing the present invention it is highly important that the fatty acid have a titre in excess of 46° C. and that the water be present in amounts of at least about 30 parts and not in excess of 180 parts per 100 parts by weight of the fatty acid. If the water is present in either larger or smaller amounts than these limits the highly soluble granular product will not be obtained. It is also necessary that the blending of the water, sodium carbonate, and fatty acid be carried out at a temperature slightly higher than the titre of the fatty acid being employed, in order to obtain these granular highly soluble products.

Surprisingly when potassium carbonate is used in place of the sodium carbonate, a dry granular product will not be obtained. The presence in the lubricant composition of soaps which are highly soluble such as the potassium soaps which would result from the use of potassium carbonate, makes it impossible to control the consistency of the composition during blending, the mass becoming too liquid and consequently hardening into large, sticky lumps.

The following example illustrates the manner in which the granular lubricating compositions of the present invention may be made.

*Example I*

A light, granular, non-caking lubricant which dissolved rapidly and easily in water was made from the following components:

| | Parts |
|---|---|
| Hydrogenated tallow fatty acid (58° C. titre) | 1000 |
| Sodium carbonate | 340 |
| Borax | 100 |
| Sodium chloride | 40 |
| Water | 927 |

The melted tallow fatty acid was mixed in a blending machine whose action consists of an alternating, rotating, shearing and dumping motion, the machine being known as a Read blender, with the salts dissolved in the water at a temperature of 70° C. As the blending proceeded, the mixture became solid, but was of a light, crumbly consistency which was easily disintegrated into granules by the action of the blender. The resulting product remained lump-free and easily soluble after several months' storage, and has been used with excellent success as a cold-forming lubricant, where its ease of solution has caused great savings in time and trouble.

To a certain extent, the amount of water in the composition must be governed by the titre of the fatty acid. Thus, the higher the titre, the more water may be present. Also, by reducing the amount of water, acids having lower titres may be used. However, there is a practical limitation to the amount of water which must be added, in that some water must be present in order to cause the saponification to proceed substantially to completion at relatively low temperatures. This lower limit is in the neighborhood of 30 parts water per 100 parts by weight of the fatty acid. On the other hand, larger amounts of water appear to increase the solubility rate of the product, and are therefore more desirable, provided the amount does not exceed about 180 parts per 100 parts fatty acid.

While there is apparently no upper limit to the titre of the fatty acid or fatty acid mixture that may be used, except that imposed by the relatively higher costs of the high titre acids, the excellent granular products of the present invention cannot be obtained if fatty acids having titres less than about 46° C. are employed. This is the case regardless of how drastically the amount of water is restricted. Use of the low titre acids results only in lumpy, gummy or liquid products.

With regard to the sodium carbonate, it should be present in the composition in an amount sufficient to completely saponify all the fatty acid present, and may be present in any amount in excess of this, up to about 100% excess. This amount corresponds to about 19 to 38 parts sodium carbonate per 100 parts by weight of the fatty acid. An excess of sodium carbonate is desirable in that it apparently helps to keep the dry mixture free-flowing during storage.

The temperature at which the blending operation takes place is preferably a few degrees above the fatty acid softening temperature. Higher temperatures are not harmful, except in that they cause greater water loss, which may in turn cause a decrease in the solubility rate of the product. Any kind of mechanical blending is suitable; however, excellent results are obtained with a blending and cutting action such as that provided by the so-called "sigma arm" blender, in addition to the ordinary "ribbon" blender, which has also given satisfactory products.

The lubricant compositions of the present invention can be used alone or as mixed with other materials in the lubrication of metal during forming operations, the lubricants being particularly suitable in metal forming and deep-drawing operations wherein they are used in conjunction with a chemically formed coating on the metal, such as a phosphate or oxalate coating.

Having described my invention, I claim:

1. A method of preparing a granular, rapidly soluble metal forming lubricant comprising blending together a mixture containing a fatty acid having a titre of at least 46° C., sodium carbonate, borax, sodium chloride and water, said sodium carbonate being present in an amount at least sufficient to completely saponify said fatty acid but not exceeding twice that amount, said borax being present in amounts of from 0 to 30 parts per 100 parts by weight of said fatty acid, said sodium chloride being present in amounts of from 0 to 15 parts per 100 parts by weight of said fatty acid, and said water being present in amounts of 30 to 180 parts per 100 parts by weight of said fatty acid, and continuing the blending at a temperature in excess of the titre of said fatty acid but not great enough to cause any appreciable water loss until saponification of the fatty acid is substantially complete.

2. A method of preparing a granular, rapidly soluble metal-forming lubricant comprising blending together a mixture containing hydrogenated tallow fatty acid, sodium carbonate, borax, sodium chloride and water, said sodium carbonate being present in an amount at least sufficient to completely saponify said hydrogenated tallow fatty acid but not exceeding twice that amount, said borax being present in amounts of from 0 to 30 parts per 100 parts by weight of said hydrogenated tallow fatty acid, said sodium chloride being present in amounts of 0 to 15 parts per 100 parts by weight of said hydrogenated tallow fatty acid, and said water being present in amounts of 30 to 180 parts per 100 parts by weight of said fatty acid, and continuing the blending at a temperature in excess of the titre of said fatty acid but not great enough to cause any appreciable water loss until saponification of the fatty acid is substantially complete.

3. A method of preparing a granular, rapidly soluble metal-forming lubricant comprising blending together about 1000 parts hydrogenated tallow fatty acid, 340 parts sodium carbonate, 100 parts borax, 40 parts sodium chloride and 927 parts water, at a temperature of about 70° C., and continuing said blending until said tallow is substantially completely saponified.

4. A granular, rapidly soluble metal forming lubricant prepared by the method of claim 1.

References Cited in the file of this patent

UNITED STATES PATENTS

| | | |
|---|---|---|
| 424,991 | Mellen | Apr. 8, 1890 |
| 1,040,530 | Ellis | Oct. 8, 1912 |
| 1,732,065 | Richards | Oct. 15, 1929 |
| 2,152,396 | Williams | Mar. 28, 1939 |
| 2,325,320 | Holuba | July 27, 1943 |
| 2,530,837 | Orozco | Nov. 21, 1950 |
| 2,664,399 | Kluender | Dec. 29, 1953 |
| 2,717,221 | Christner | Sept. 6, 1955 |
| 2,753,304 | Orozco | July 3, 1956 |

FOREIGN PATENTS

| | | |
|---|---|---|
| 473,220 | Great Britain | Oct. 8, 1937 |

OTHER REFERENCES

"The Handbook of Soap Manufacture," Simmons et al., Van Nostrand, N.Y., 1908, pp. 45 and 46.

"Modern Soaps, Candles and Glycerin," Lamborn, Van Nostrand Co., N.Y., 1920, pp. 317–319.

"Soap Making Manual," Thomssen, Van Nostrand Co., N.Y., 1922, pp. 45 and 46.

"Soaps and Detergents," Thomssen et al., MacNair-Dorland Co., N.Y., 1949, pp. 152 and 153.